United States Patent
Dhuleshia et al.

(10) Patent No.: US 10,785,096 B2
(45) Date of Patent: **\*Sep. 22, 2020**

(54) GRAPHICAL USER INTERFACES FOR DEVICE DISCOVERY AND SCHEDULING THEREOF

(71) Applicant: ServiceNow, Inc., Santa Clara, CA (US)

(72) Inventors: Amit Dhuleshia, San Diego, CA (US); Joshua Paul Gerbasi, San Diego, CA (US); Oron Subayi, Rishon LeZion (IL); Satya Kiran Noolu, San Diego, CA (US); Hardik Mahendrakumar Modi, San Diego, CA (US); Kishore Srinivasa Reddy, San Diego, CA (US); Amit Arom-Zohar, Santa Cruz, CA (US)

(73) Assignee: ServiceNow, Inc., Santa Clara, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/133,177

(22) Filed: Sep. 17, 2018

(65) Prior Publication Data

US 2019/0342156 A1    Nov. 7, 2019

Related U.S. Application Data

(60) Provisional application No. 62/667,822, filed on May 7, 2018.

(51) Int. Cl.
*H04L 12/24*    (2006.01)
*H04L 29/12*    (2006.01)

(52) U.S. Cl.
CPC ...... *H04L 41/0803* (2013.01); *H04L 41/0213* (2013.01); *H04L 41/046* (2013.01);
(Continued)

(58) Field of Classification Search
CPC ............. H04L 41/0803; H04L 41/0213; H04L 41/046; H04L 41/12; H04L 41/22; H04L 41/28; H04L 61/6068
(Continued)

(56) References Cited

U.S. PATENT DOCUMENTS 10,263,849 B2 *   4/2019   Makovsky ............. H04L 67/30
10,341,841 B2 *   7/2019   Owen ..................... H04L 41/22
(Continued)

*Primary Examiner* — James E Springer
(74) *Attorney, Agent, or Firm* — Fletcher Yoder PC

(57) ABSTRACT

A computing system may include one or more server devices within a computational instance that remotely manages computing devices of a managed network. The computing devices may include routers that are interconnected by subnets of the managed network, and the managed network may also include a proxy server device communicatively coupled to at least one of the subnets. The server devices may be configured to: (i) provide a proxy server configuration pane of a graphical user interface (GUI) that allows specification of the proxy server device; (ii) provide a router credentials configuration pane of the GUI that allows specification of router access credentials for the routers; (iii) provide a subnet discovery scheduling pane of the GUI that allows specification of a subnet schedule for carrying out discovery of the subnets; and (iv) cause the proxy server device to perform discovery of the subnets according to the subnet schedule.

18 Claims, 15 Drawing Sheets

(52) U.S. Cl.
CPC .............. *H04L 41/12* (2013.01); *H04L 41/22* (2013.01); *H04L 41/28* (2013.01); *H04L 61/6068* (2013.01)

(58) Field of Classification Search
USPC ......................................................... 709/223
See application file for complete search history.

(56) References Cited

U.S. PATENT DOCUMENTS

| | | |
|---|---|---|
| 10,509,541 B2 * | 12/2019 | Makovsky .............. H04L 41/12 |
| 10,511,486 B2 * | 12/2019 | Owen .................... G06F 9/5072 |
| 2007/0094371 A1 * | 4/2007 | Graves ................ H04L 63/0209 |
| | | 709/223 |
| 2008/0189405 A1 * | 8/2008 | Zarenin ................. H04L 67/125 |
| | | 709/224 |
| 2010/0058057 A1 * | 3/2010 | Sutherland ................ G06F 8/65 |
| | | 713/168 |
| 2016/0112270 A1 * | 4/2016 | Danait .................. H04L 41/142 |
| | | 709/220 |
| 2017/0257283 A1 * | 9/2017 | O'Malley ............. G06F 3/0484 |
| 2018/0113581 A1 * | 4/2018 | Makovsky ............. H04L 41/22 |
| 2018/0115462 A1 * | 4/2018 | Makovsky ............. H04L 67/34 |
| 2018/0225011 A1 * | 8/2018 | Lindsey .................. G06F 21/53 |
| 2018/0324044 A1 * | 11/2018 | Owen .................... H04L 41/12 |
| 2019/0104398 A1 * | 4/2019 | Owen .................... H04L 67/28 |

\* cited by examiner

GRAPHICAL USER INTERFACES FOR DEVICE DISCOVERY AND SCHEDULING THEREOF

CROSS-REFERENCE TO RELATED APPLICATION

The present application is a non-provisional patent application claiming priority to U.S. Provisional Pat. App. No. 62/667,822, filed May 7, 2018, the contents of which are hereby incorporated by reference.

BACKGROUND

Network discovery involves probing a number of computing devices on a managed network in order to determine these devices' configurations and relationships to one another. From such a discovery process, representations of the devices, software applications installed on the devices, and related configuration details may be stored in a database as configuration items. These configuration items may then be used as the basis of information technology service and operations management, software asset management, and a variety of other important network services and operations.

SUMMARY

On a large managed network, such as an enterprise network serving thousands of users across multiple locations, discovery may be a complex process that requires a significant amount of time to complete. Configuration of discovery involves specification of access credentials for routers and hosts on the managed network on which to initiate discovery. Once initiated, these computing devices are probed, using the access credentials, to determine one or more connected subnets, and then the Internet Protocol (IP) addresses in the ranges of these subnets are probed to discover more devices. In this manner, discovery may continue recursively for several minutes or hours to learn about devices on the managed network.

Unfortunately, discovery can fail, partially or completely, for a number of reasons. Most common causes involve access credentials for one or more devices not being properly specified or specified at all. Other reasons can include a subnet of the managed network being discovered but the IP addresses of this subnet not being probed for devices in a timely fashion. Furthermore, due to discovery potentially being a lengthy and resource-intensive process, it may be beneficial to schedule discovery to be carried out at a time at which the managed network is expected to be lightly utilized (e.g., overnight). Thus, for sites in different time zones, discovery should be scheduled at different times.

Current graphical user interfaces (GUIs) that support configuration and operation of discovery can be complex and confusing to all but the experienced user. In some cases, conventional GUIs for discovery configuration may involve a single pane in which a multitude of semi-related information is entered. Or, the user might have to switch back and forth between multiple panes of the GUI in order to enter information that is consistent across these panes.

Nonetheless, discovery should be an ordered process with distinct phases. Therefore, an improved GUI may provide a guided workflow, stepping the user through a series of panes of the GUI in a logical fashion and in accordance with the phases. Thus, the information provided on a previous pane may influence the information requested on a subsequent pane. By walking the user through these panes, the user is less likely to become overwhelmed or to misconfigure discovery. To that end, some panes may allow the user to test parts of the discovery configuration before moving on to the next pane. As a consequence, when discovery is carried out, it is more likely to complete successfully with little or no errors.

Accordingly, in a first example embodiment, one or more server devices may be within a computational instance of a remote network management platform, where the computational instance remotely manages computing devices of a managed network, where the computing devices include routers that are interconnected by subnets of the managed network, and where the managed network also includes a proxy server device communicatively coupled to at least one of the subnets. The one or more server devices may be configured to: (i) provide, for display on a client device, a proxy server configuration pane of a GUI that allows specification of the proxy server device; (ii) provide, for display on the client device, a router credentials configuration pane of the GUI that allows specification of router access credentials for the routers; (iii) provide, for display on the client device, a subnet discovery scheduling pane of the GUI that allows specification of a subnet schedule for carrying out discovery of the subnets; (iv) cause the proxy server device to perform discovery of the subnets according to the subnet schedule, where discovery of the subnets involves the proxy server device using the router access credentials to access the routers and obtain therefrom configuration of the subnets; and (v) receive, from the proxy server device, the configuration of the subnets.

A second example embodiment may involve providing, by one or more server devices within a computational instance of a remote network management platform and for display on a client device, a proxy server configuration pane of a GUI that allows specification of a proxy server device, where the computational instance remotely manages computing devices of a managed network, where the computing devices include routers that are interconnected by subnets of the managed network, and where the proxy server device is communicatively coupled to at least one of the subnets. The second example embodiment may also involve providing, by the one or more server devices and for display on the client device, a router credentials configuration pane of the GUI that allows specification of router access credentials for the routers. The second example embodiment may also involve providing, by the one or more server devices and for display on the client device, a subnet discovery scheduling pane of the GUI that allows specification of a subnet schedule for carrying out discovery of the subnets. The second example embodiment may also involve causing, by the one or more server devices, the proxy server device to perform discovery of the subnets according to the subnet schedule, where discovery of the subnets involves the proxy server device using the router access credentials to access the routers and obtain therefrom configuration of the subnets. The second example embodiment may also involve receiving, by the one or more server devices and from the proxy server device, the configuration of the subnets.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
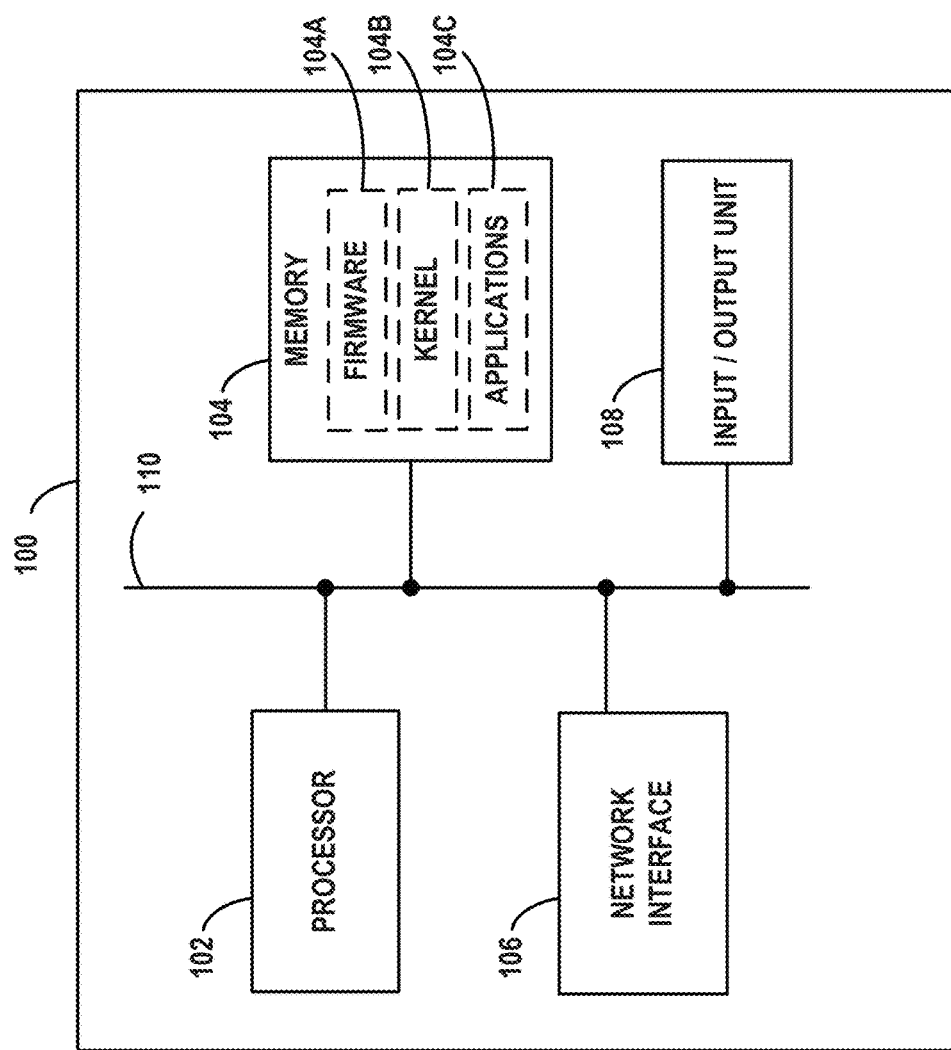
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
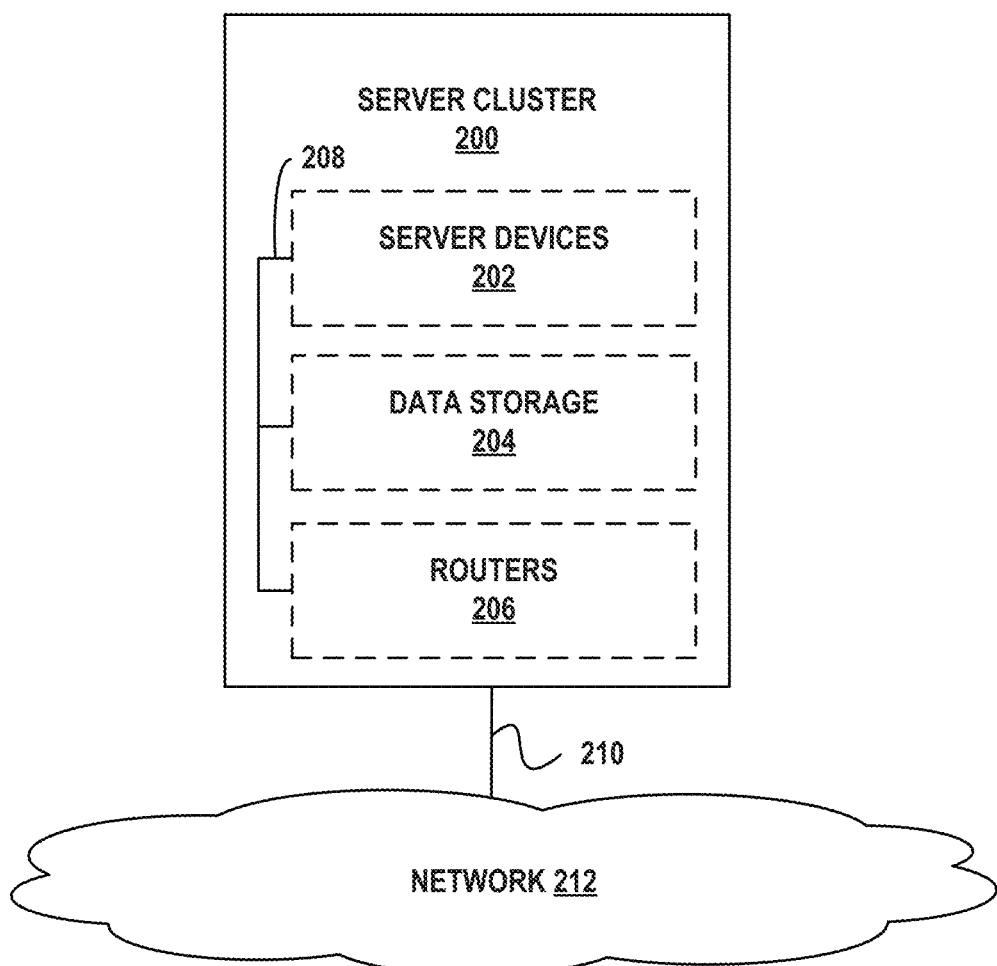
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
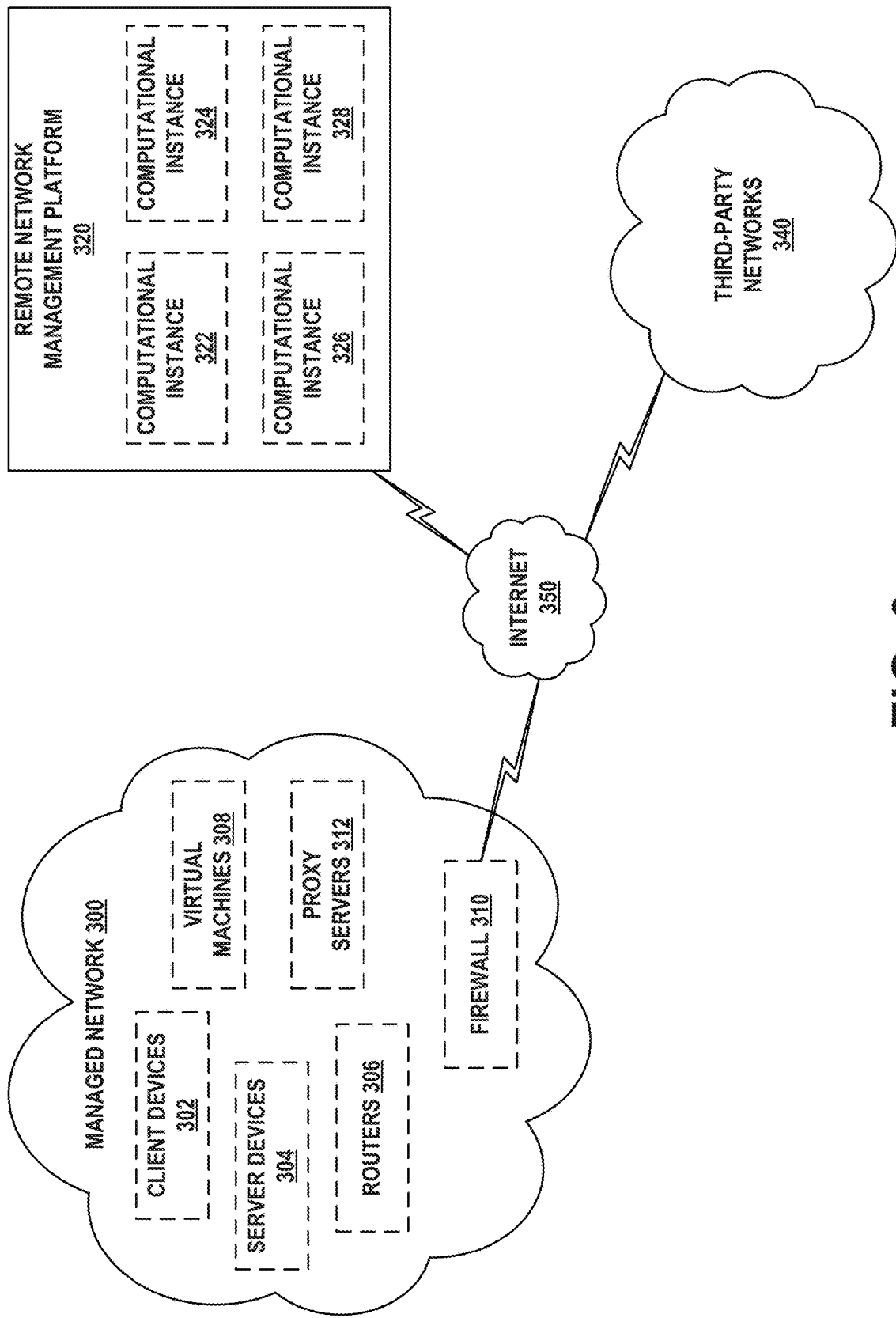
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
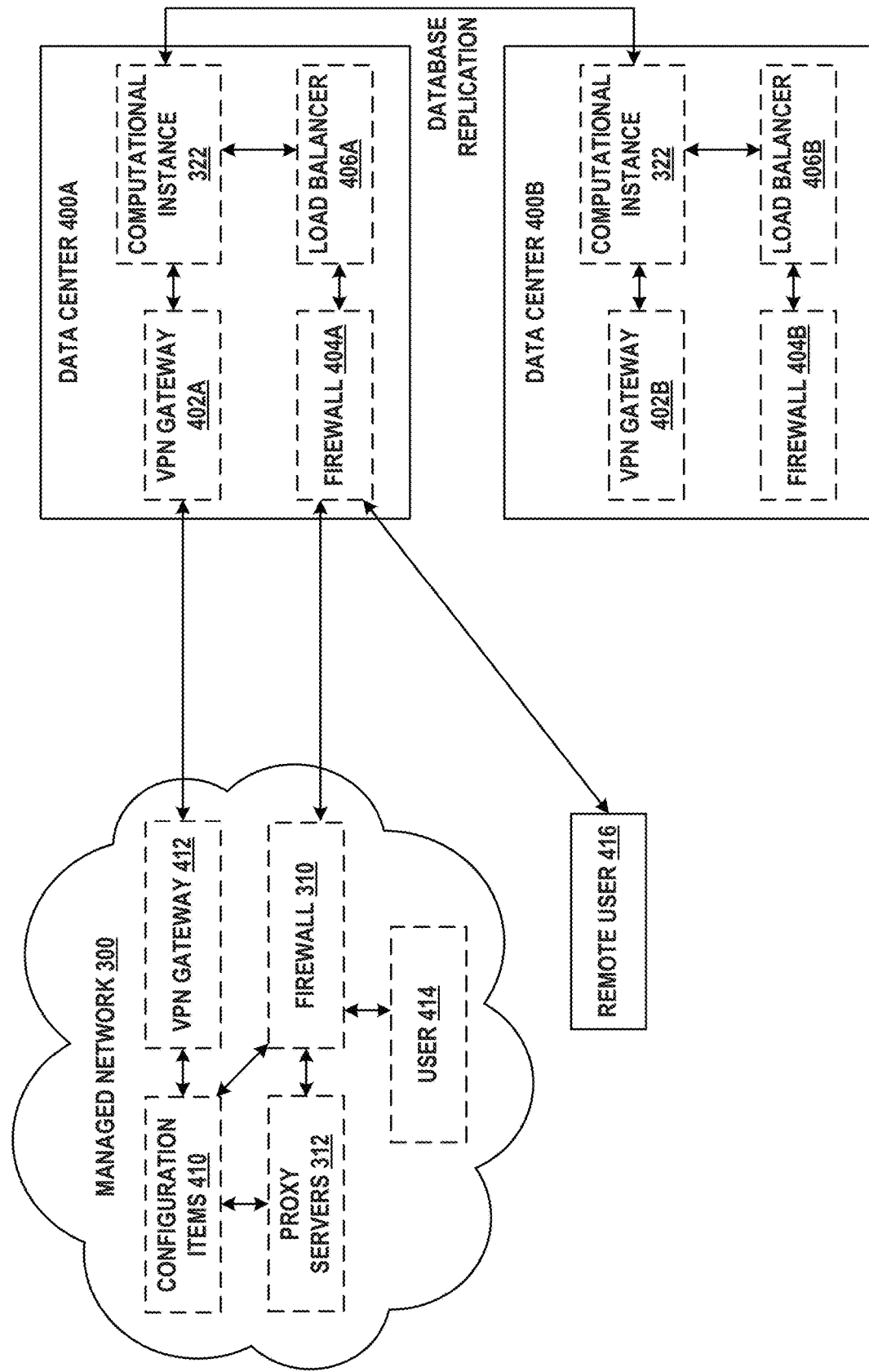
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
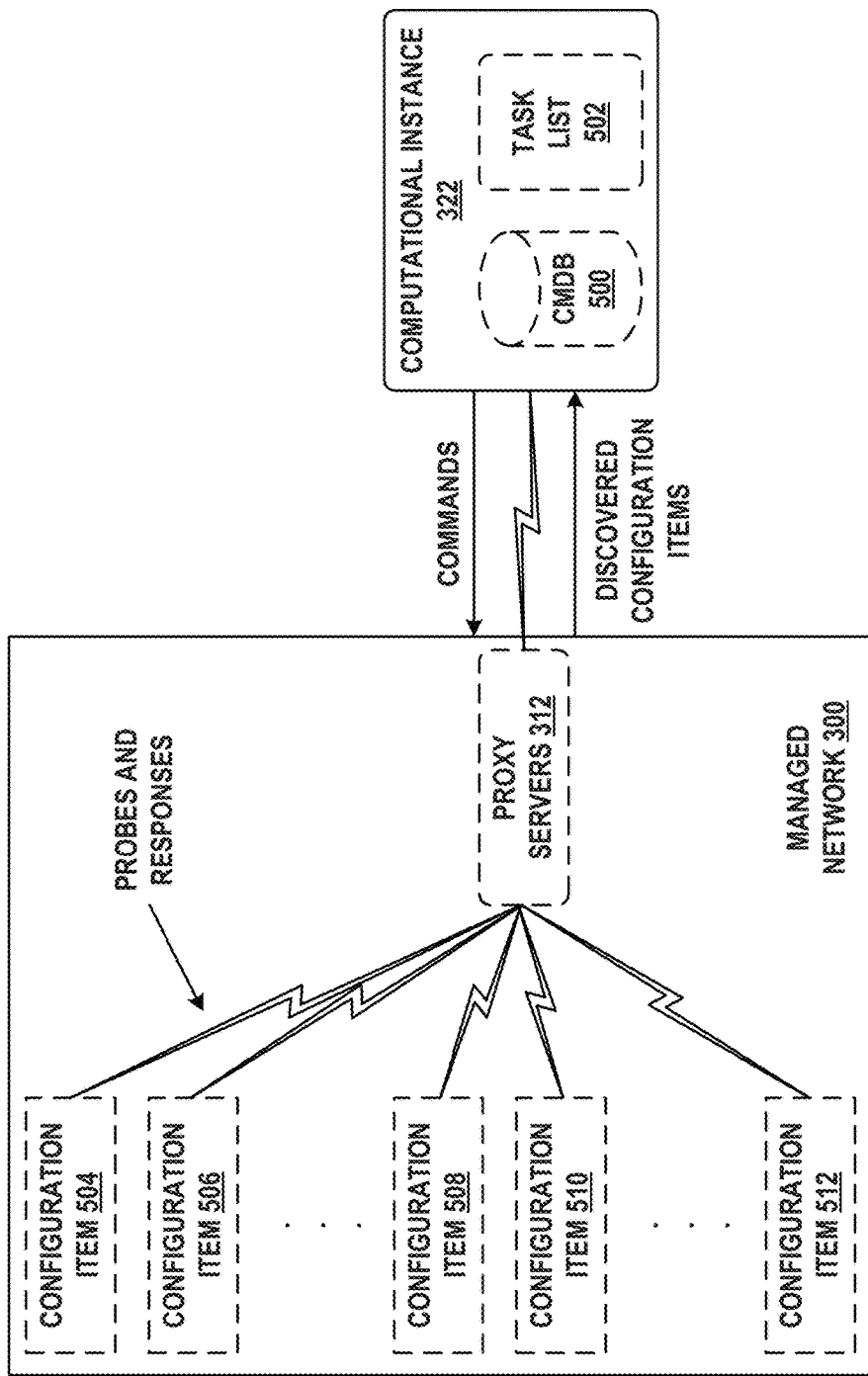
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
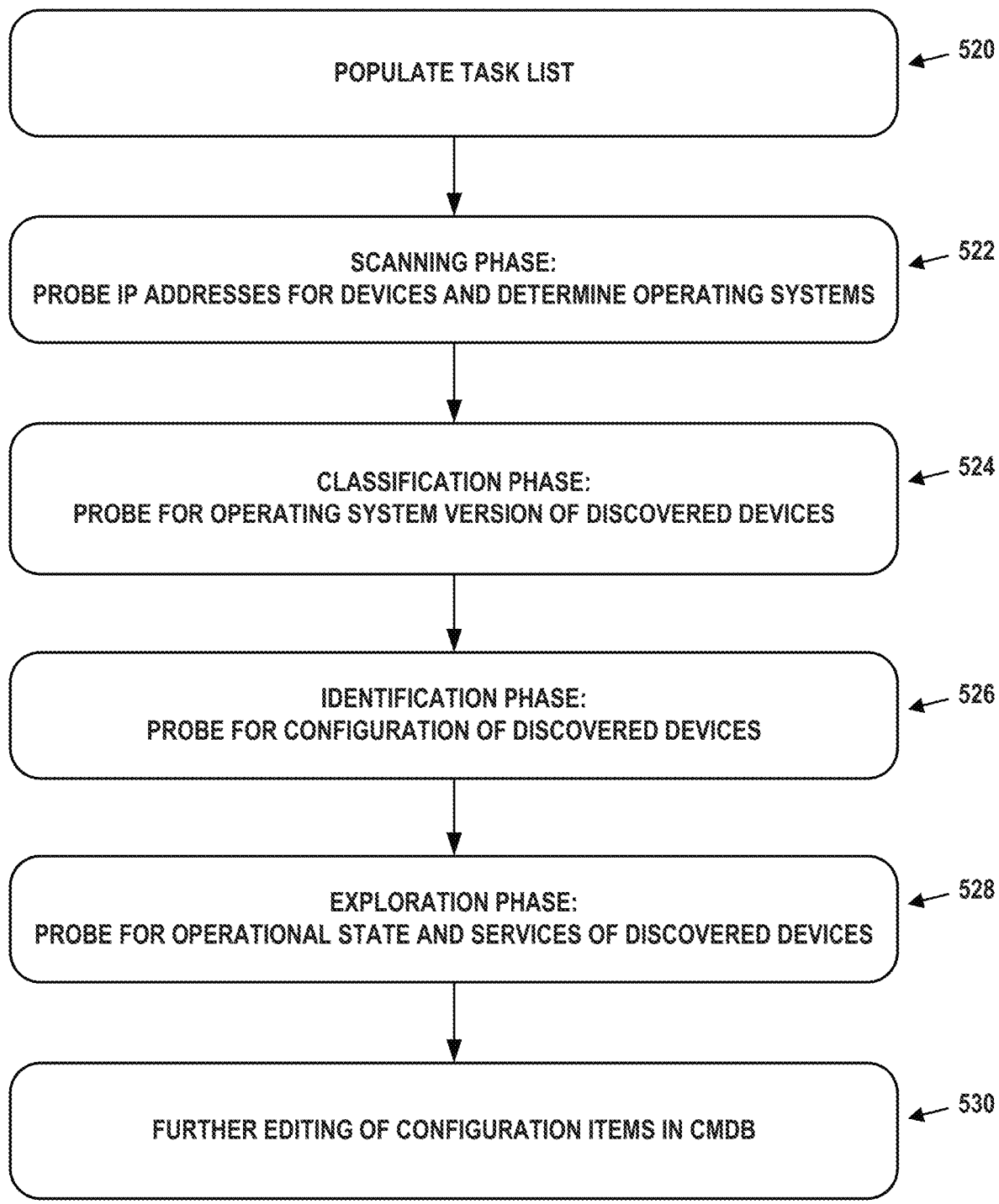
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Improved Graphical User Interfaces for Configuring Discovery

As described herein, the term "pane" may refer to a GUI component that contains one or more locations in which to display information, and/or one or more user-selectable items such as buttons or tabs. In some embodiments, a pane may be equivalent to, or contained within, a page or a GUI window. Buttons and/or tabs may be graphical control elements that display additional information within the pane. The GUIs and/or panes described herein may be provided to users when they access a computational instance on a remote network management platform, such as computational instance 322 within remote network management platform 320 as described in FIG. 3.

As previously noted, configuration of discovery by way of GUIs can be a complex and error-prone task for most users.

The embodiments herein address these limitations by way of a series of GUI panes that provide a logical workflow for discovery configuration. As a result of these embodiments, discovery is more likely to be configured properly and more likely to operate with fewer errors. Example panes are shown in FIGS. 6A, 6B, 6C, 6D, 7A, 7B, 7C, and 7D. These panes may allow scheduling discovery of subnets of routers and hosts connected to proxy servers. Roughly speaking, discovery configuration is broken into two phases—subnet discovery (described in the context of FIGS. 6A, 6B, 6C, and 6D) and host discovery (described in the context of FIGS. 7A, 7B, 7C, and 7D).

A. Subnet Discovery

Figure 6A:
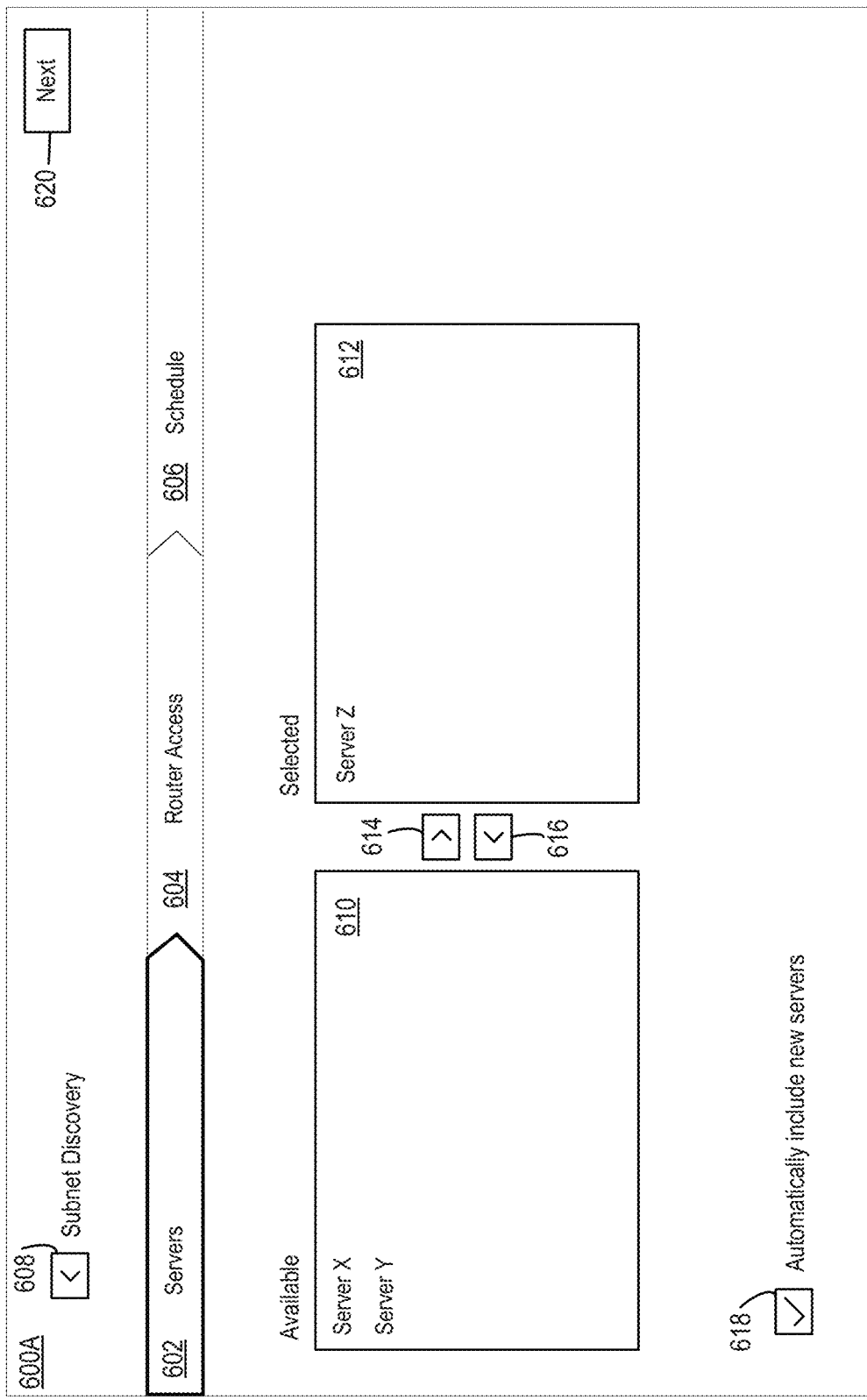
FIG. 6A depicts a proxy server configuration pane, in accordance with example embodiments.

FIG. 6A depicts proxy server configuration pane 600A that includes navigation identifiers 602, 604, and 606, directory button 608, proxy server selection windows 610 and 612, proxy server manipulation buttons 614 and 616, checkbox 618, and navigation button(s) 620.

Navigation identifiers 602, 604, and 606 identify corresponding panes. In FIG. 6A, navigation identifier 602 displays the text "Servers" (which refers to proxy servers), navigation identifier 604 displays the text "Router Access," and navigation identifier 606 displays the text "Schedule." Thus, navigation identifier 602 may correspond to proxy server configuration pane 600A, navigation identifier 604 may correspond to a router credentials configuration pane (shown in FIG. 6B), and navigation identifier 606 may correspond to a subnet discovery scheduling pane (shown in FIG. 6C). In FIG. 6A, navigation identifier 602 is emphasized to indicate that it is associated with the currently displayed pane. In some embodiments, other panes may exist that do not directly correspond to one of navigation identifiers 602, 604, and 606. Each navigation identifier may be selectable to navigate to its associated pane.

Directory button 608 may include a link to access another set of GUI panes. If the user wishes to access another feature of the GUI (e.g., a feature not related to discovery configuration), the user may select directory button 608 to access, for example, a menu of these features (not shown).

Proxy server selection windows 610 and 612 may display the proxy servers available and the proxy servers selected for discovery, respectively. FIG. 6A shows "Server X" and "Server Y" as available in proxy server selection window 610 and "Server Z" as selected in proxy server selection window 612.

By way of server manipulation buttons 614 and 616, proxy servers can be moved from proxy server selection window 610 to proxy server selection window 612, and vice versa. For example, as shown, "Server X" and "Server Y" are available in proxy server selection window 610. If "Server X" is selected and then server manipulation button 614 is activated, "Server X" may move from proxy server selection window 610 to proxy server selection window 612. This indicates that "Server X" has been selected for discovery. Similarly, if "Server Z" is selected and then server manipulation button 616 is activated, "Server Z" may move to proxy server selection window 610.

Checkbox 618 may be selectable to indicate whether proxy server selection window 610 is to include new proxy servers when they are discovered. For instance, a large enterprise may include several proxy servers. If a proxy server that was not previously specified in the discovery configuration is discovered, this new proxy server may be displayed in proxy server selection window 610 the next time pane 600A is accessed.

Navigation button(s) 620 include, in this case, a single selectable button configured to move to the next pane in the workflow. Selection of navigation button(s) 620 may cause the GUI to change to router credentials configuration pane 600B as shown in FIG. 6B.

Figure 6B:
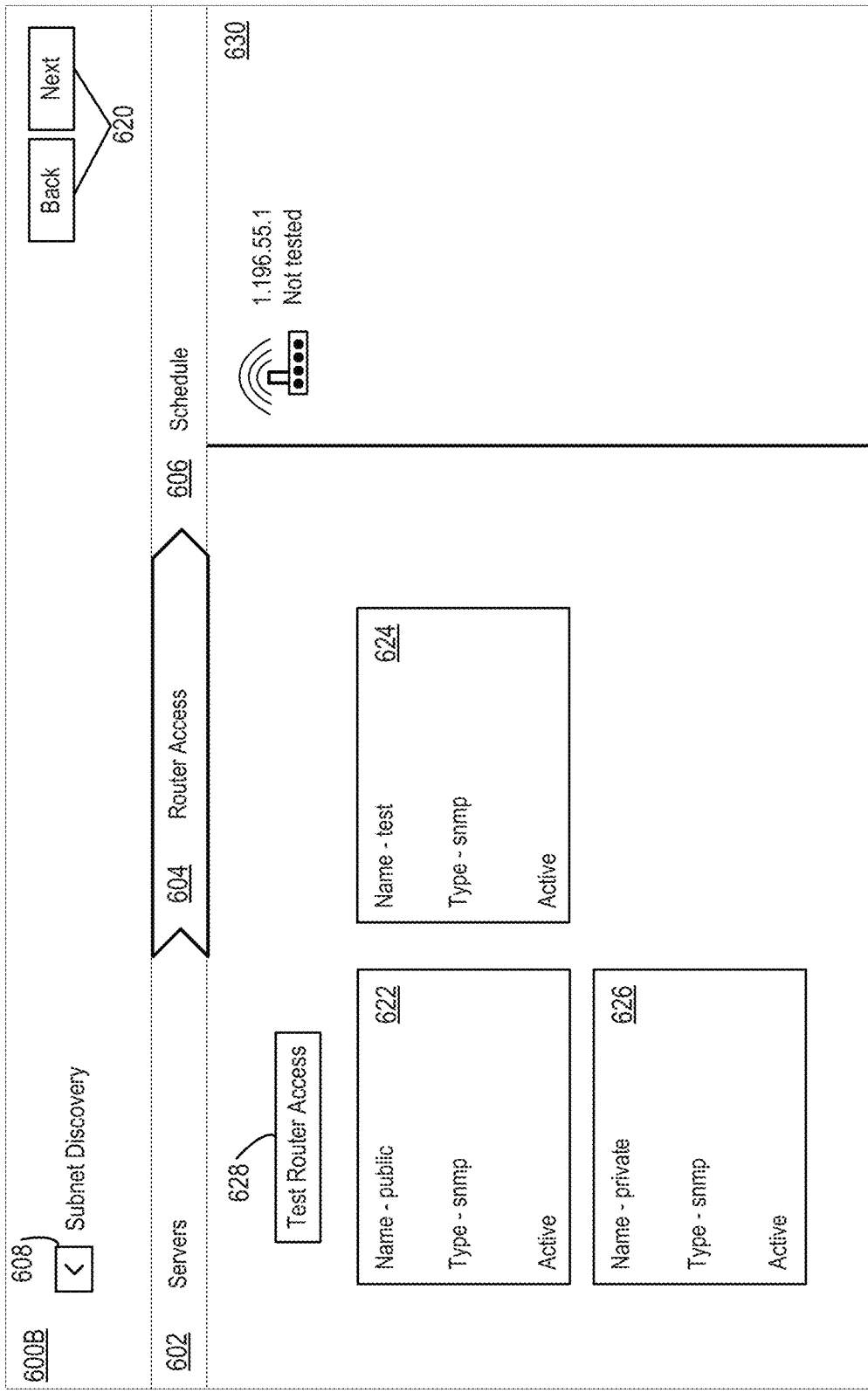
FIG. 6B depicts a router credentials configuration pane, in accordance with example embodiments.

FIG. 6B shows router credentials configuration pane 600B, which includes the same navigation identifiers 602, 604, and 606, directory button 608, and navigation button(s) 620 as proxy server configuration pane 600A. In this case, navigation identifier 604 is emphasized, indicating that the displayed pane is related to router access. Router credentials configuration pane 600B also includes router credential windows 622, 624, and 626, test button 628, and router status window 630.

Navigation identifiers 602, 604, and 606, directory button 608, and navigation button(s) 620 may provide the same or similar functionality as described above. However, navigation button(s) 620 in FIG. 6B may provide further navigation by switching the GUI back to proxy server configuration pane 600A (when the "back" button is selected) as well as forward to the next pane in the workflow (when the "next" button is selected).

Router credential windows 622, 624, and 626 may be selectable to allow credential entry for various routers of the managed network. As shown in FIG. 6B, router credential windows 622, 624, and 626 display: (i) a userid or community string, (ii) the type of access protocol (e.g., SNMP, SSH), and (iii) credential status. The userid or community string may be a username/password combination (with the password not shown) or an SNMP community string when the access protocol is SNMPv1 or SNMPv2. Other types of credentials are possible. The access protocol refers to the method used to access (e.g., log in to) the router. Credential status may be either active or inactive, for example, where active credentials are used during discovery and inactive credentials are not.

As an example, router credential window 622 displays a credential configured with "public" as community string, with an access protocol of SNMP, and that is active. In operation, selecting any of router credential windows 622, 624, and/or 626 may display an additional configuration pane (not shown), that allows entry of router access credentials.

Test router access button 628 may be selectable to test the credentials within router credential windows 622, 624, and 626 against the router(s) displayed in router status window 630. In operation, selection of test router access button 628 may cause a proxy server to attempt to access this router using one or more of the configured credentials. If use of any one or more of the credentials results in accessing the router, then the result may be considered successful. If attempts with all credentials fail, the result may be considered unsuccessful. This result may then be displayed in router status window 630.

Router status window 630 may display the routers available for testing of the credentials entered in router credentials windows 622, 624, and 626. As shown in FIG. 6B, the router has IP number "1.196.55.1" and a status of "Not tested." However, after a test is performed against this router, router status window 630 may display a status of "Successful," or "Unsuccessful," depending on whether the configured credentials allowed access to the router. With or without testing of the credentials, selection of the "Next" button of navigation button(s) 620 may cause the GUI to switch to the next pane in the workflow.

Notably, the arrangement of proxy server configuration pane 600A followed by router credentials configuration pane 600B in this workflow logically guides the user in a top-down fashion. First, the user is prompted to identify one or more proxy servers for discovery, and then the user is prompted to specify access credentials for routers that are reachable by way of these proxy servers. Furthermore, the user can test the credentials to ensure that they can be used to successfully access routers. In this way, errors associated with discovery configuration can be avoided.

Figure 6C:
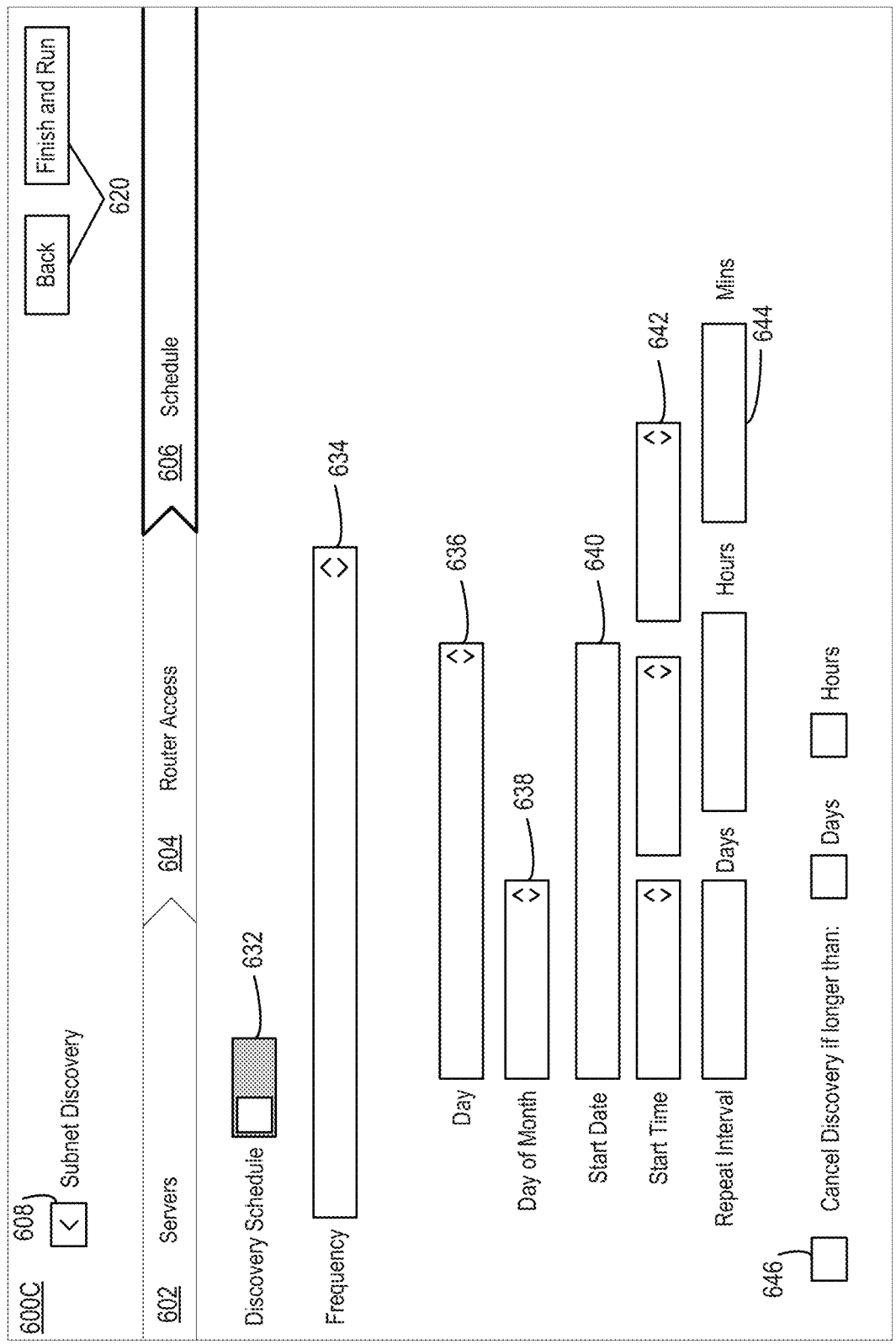
FIG. 6C depicts a subnet discovery scheduling pane, in accordance with example embodiments.

FIG. 6C shows a subnet discovery scheduling pane 600C that includes the same or similar navigation identifiers 602, 604, and 606, directory button 608, and navigation button(s) 620 as proxy server configuration pane 600A and router credentials configuration pane 600B, along with schedule toggle 632, frequency selector 634, day selector 636, day of month selector 638, start date 640, start time 642, repeat interval 644, and checkbox 646.

Schedule toggle 632 may be a toggle and/or slider configured to turn on or off the subnet scheduling feature. In operation, when schedule toggle 632 is off, frequency selector 634, day selector 636, day of month selector 638, start date 640, start time 642, repeat interval 644, and checkbox 646 may be grayed out and/or not selectable. When schedule toggle 632 is on, the same elements may be active and selectable. As shown in FIG. 6C, the schedule toggle is off.

Frequency selector 634 may be a drop-down menu that has various options for the frequency at which the proxy servers perform subnet discovery. The options in frequency selector 634 may include "Hourly," "Daily," "Weekly," "Monthly," "Once," "Periodically," and "On Demand." In operation, selection of one of these in frequency selector 634 may affect which of the remaining day selector 636, day of month selector 638, start date 640, start time 642, repeat interval 644 are displayed. For example, if "Daily" is selected in frequency selector 634, then start time 642 may be displayed but day selector 636, day of month selector 638, and repeat interval 644 might not be displayed. In another example, if "Monthly" is selected in frequency selector 634, day of month selector 638 and start time 642 may be displayed, but day selector 636 and repeat interval 644 might not be displayed. In another example, if "Once" is selected in frequency selector 634, day selector 636 and start time 642 may be displayed, while day of month selector 638 and repeat interval 644 might not be displayed.

Checkbox 646 may be selectable to cancel subnet discovery in the event that the proxy server's discovery lasts longer than a predetermined amount of time. When selected, checkbox 646 may display additional fields to allow specification of a number of days and hours that discovery should run before being cancelled. For example, checkbox 646 may be selected and the associated fields may receive an input of one day and three hours. If the proxy server's discovery goes past one day and three hours, the discovery may cease and the output may include information regarding the routers and subnets that were discovered up to this point.

After the discovery of subnets on proxy server 312 is scheduled, "Finish and Run" may be selected on navigation button(s) 620. This selection may cause the configured proxy server to perform discovery of the subnets according to the subnet schedule selected in subnet discovery scheduling pane 600C.

Notably, the arrangement of router credentials configuration pane 600B followed by subnet discovery scheduling pane 600C in this workflow logically guides the user toward scheduling subnet discovery. Since access credentials are necessary for discovery to be successful, the user is prompted to enter (or edit) these in router credentials configuration pane 600B before scheduling (and potentially starting) subnet discovery in subnet discovery scheduling pane 600C.

Figure 6D:
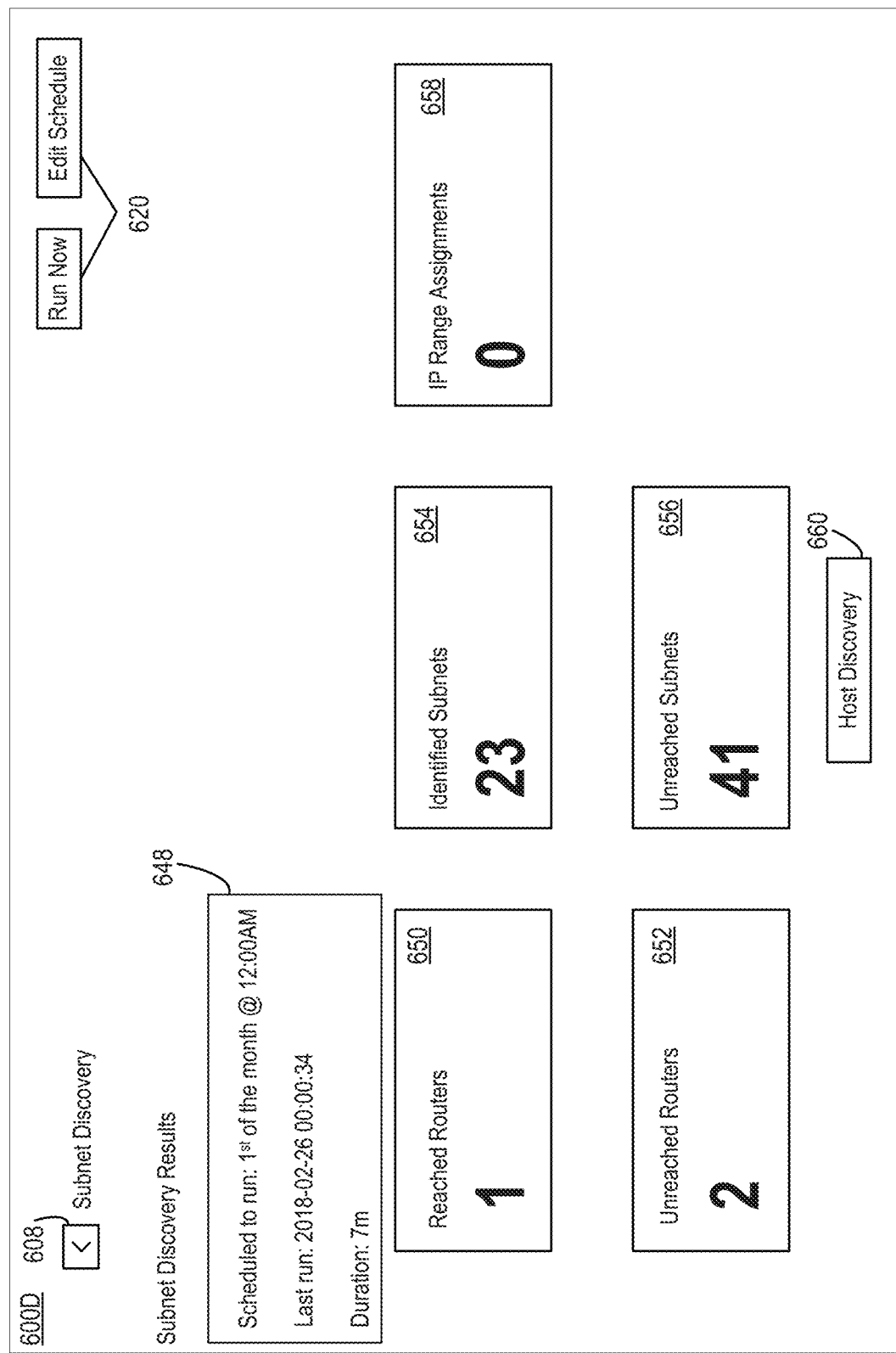
FIG. 6D depicts a subnet discovery results pane, in accordance with example embodiments.

FIG. 6D shows a subnet discovery results pane 600D that includes the same directory button 608 and navigation button(s) 620 as proxy server configuration pane 600A, router credentials configuration pane 600B, and subnet discovery scheduling pane 600C, as well as schedule information 648, results windows 650, 652, 654, 656, and 658, and device discovery button 660.

Schedule information 648 may include information pertaining to the subnet schedule specified in subnet discovery scheduling pane 600C in FIG. 6C. Schedule information 648 may also include information regarding the proxy server's most recent discovery operation, such as a timestamp and duration of this operation. As shown in FIG. 6D, schedule information 648 includes the information "Scheduled to run: $1^{st}$ of the month @ 12:00 AM," "Last run: 2018-02-26 00:00:34," and "Duration: 7 m."

Results windows 650, 652, 654, 656, and 658 may include results from the proxy server's most recent discovery operation. Specifically, results window 650 may include the number of routers reached during discovery. A router may be "reached" when the router was able to be accessed using the credentials entered in router credentials configuration pane 600B. As shown in FIG. 6D, results window 650 shows the proxy server's most recent discovery operation reached one router.

Results window 652 may include the number of unreached routers during the most recent discovery. An unreached router is a router for which access attempts failed—for example, if none of the configured access credentials can successfully access a router, the router may be considered to be unreached. As shown in FIG. 6D, results window 652 shows the proxy server's most recent discovery operation resulted in two unreached routers.

Results window 654 may include the number of identified subnets during the most recent discovery operation. An identified subnet may be a subnet of the managed network on which devices were successfully discovered. As shown in FIG. 6D, results window 652 shows that the proxy server's most recent discovery operation yielded 23 identified subnets.

Results window 656 may include the number of unidentified subnets during the most recent discovery operation. As shown in FIG. 6D, results window 654 shows that the proxy server's most recent discovery operation yielded 41 unidentified subnets.

Results window 658 may include the number of IP Range Assignments identified during the most recent discovery operation. IP range assignments are ranges of IP addresses that are determined to be reachable from a particular proxy server, and are automatically added to the discovery configuration of that proxy server. As shown in FIG. 6D, results window 658 shows that the proxy server's most recent discovery operation yielded zero IP Range Assignments.

Host discovery button 660 may be selectable to switch the GUI from subnet discovery related panes to host discovery related panes. Thus, selection of host discovery button 660 may cause the display of host credentials configuration pane 700A, shown in FIG. 7A.

Notably, the arrangement of subnet discovery scheduling pane 600C followed by subnet discovery results pane 600D in this workflow logically guides the user to view the results of the scheduled subnet discovery. A user is prompted to specify schedule details to discover subnets, and then the user is shown the results of the scheduled discovery.

While the previous discussion implies that panes of the subnet discovery workflow should be presented in the order in which they were described (e.g., from the pane of FIG.

6A, then to that of FIG. 6B, then to that of FIG. 6C, and then to that of FIG. 6D), this need not be the case. While the described ordering has the advantages discussed above, other orderings of these and/or other panes may be used in similarly effective workflows.

B. Host Discovery

Host discovery is a phase of device discovery that usually follows subnet discovery. Nonetheless, subnet discovery and host discovery can be configured in a fashion that makes them mostly independent from one another. Also, subnet discovery and host discovery can be scheduled independently. For example, host discovery might be performed more frequently than subnet discovery due to it being more likely that hosts on a subnet change than subnet configurations change.

Figure 7A:
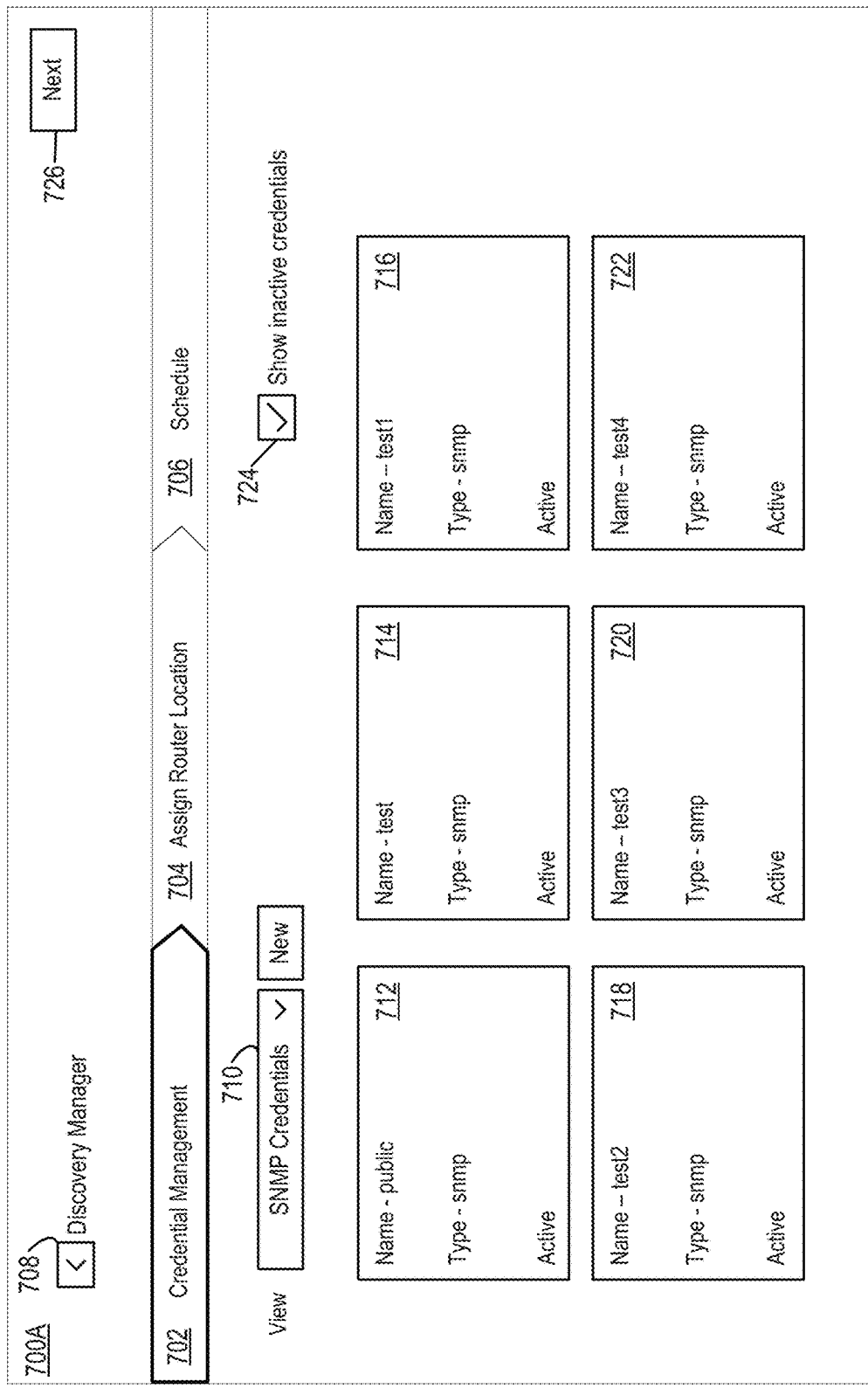
FIG. 7A depicts a host credentials configuration pane, in accordance with example embodiments.

FIG. 7A shows host credentials configuration pane 700A that includes navigation identifiers 702, 704, and 706, directory button 708, credential drop-down menu 710, host credential windows 712, 714, 716, 718, 720, and 722, checkbox 724, and navigation button(s) 726.

Navigation identifiers 702, 704, and 706 identify the currently displayed pane as well as other panes within the host discovery workflow. In FIG. 7A, navigation identifier 702 displays the text "Credential Management," navigation identifier 704 displays the text "Assign Router Location," and navigation identifier 706 displays the text "Schedule."

Each navigation identifier may correspond to a specific pane in the workflow. Navigation identifier 702 is emphasized to indicate that the currently displayed pane is host credentials configuration pane 700A. Navigation identifier 704 may correspond to router location pane 700B (shown in FIG. 7B), and navigation identifier 706 may correspond to host discovery scheduling pane 700C (shown in FIG. 7C). In some embodiments, other panes may exist that do not directly correspond to one of navigation identifiers 702, 704, and 706.

Directory button 708 may include a link to access set of other GUI panes. If the user wishes to access another feature of the GUI (e.g., a feature not related to discovery), the user may select directory button 708 to access, for example, a menu of these features (not shown).

Credential drop-down menu 710 may include a drop-down menu with options to display host credential windows that correspond to a particular host access protocol. The options within credential drop-down menu 710 may include, for example, "Applicative Credentials," "Cim Credentials," "SNMP Community Credentials," "Snmpv3 Credentials," "SSH Credentials," "SSH Private Key Credentials," "VMWare Credentials," and "Windows Credentials." In operation, selection of one of these options may change the displayed credentials in host credential windows 712, 714, 716, 718, 720, and 722. For example, if "SSH Credentials" is selected, the host credentials displayed in host credential windows 712, 714, 716, 718, 720, and 722 may correspond to SSH credentials. In FIG. 7A, "SNMP Community Credentials" has been selected in credential drop-down menu 710. As a result, host credential windows 712, 714, 716, 718, 720, and 722 may correspond to SNMP credentials.

Host credential windows 712, 714, 716, 718, 720, and 722 may be user-selectable and may display (i) a userid or community string, (ii) the type of access protocol, and (iii) credential status. The userid or community string may be a username/password combination (with the password not shown) or an SNMP community string when the access protocol is SNMPv1 or SNMPv2. Other types of credentials are possible. The access protocol refers to method used to access (e.g., log in to) the host. Credential status may be either active or inactive, for example, where active credentials are used for discovery and inactive credentials are not. As shown in FIG. 7A, host credential window 712 has a userid "public," access protocol type "snmp," and credential status "Active."

In operation, selection of any of host credential windows 712, 714, 716, 718, 720, or 722 may display an additional configuration pane (not shown), that is configured to accept host access credentials for the hosts of the managed network. The host access credentials may include a username and password, as an example.

Checkbox 724 may be selectable to display host credential windows that are inactive. In operation, when checkbox 724 is selected, additional inactive host credential windows may be displayed within the host credentials configuration pane. In contrast, when checkbox 724 is unselected, the inactive host credential windows may be hidden. This hiding of the inactive host credential windows may be beneficial because it allows the user to focus on host access credentials that are used for discovery.

Navigation button(s) 726 may be one or more selectable buttons with the same or similar functionality to navigation button(s) 620 in FIGS. 6A-6D. Navigation button(s) 726 in FIG. 7A may be configured to switch the workflow to the next pane. Thus, if the navigation button "Next" is selected, host credential configuration pane 700A may switch to router location pane 700B (shown in FIG. 7B).

Figure 7B:
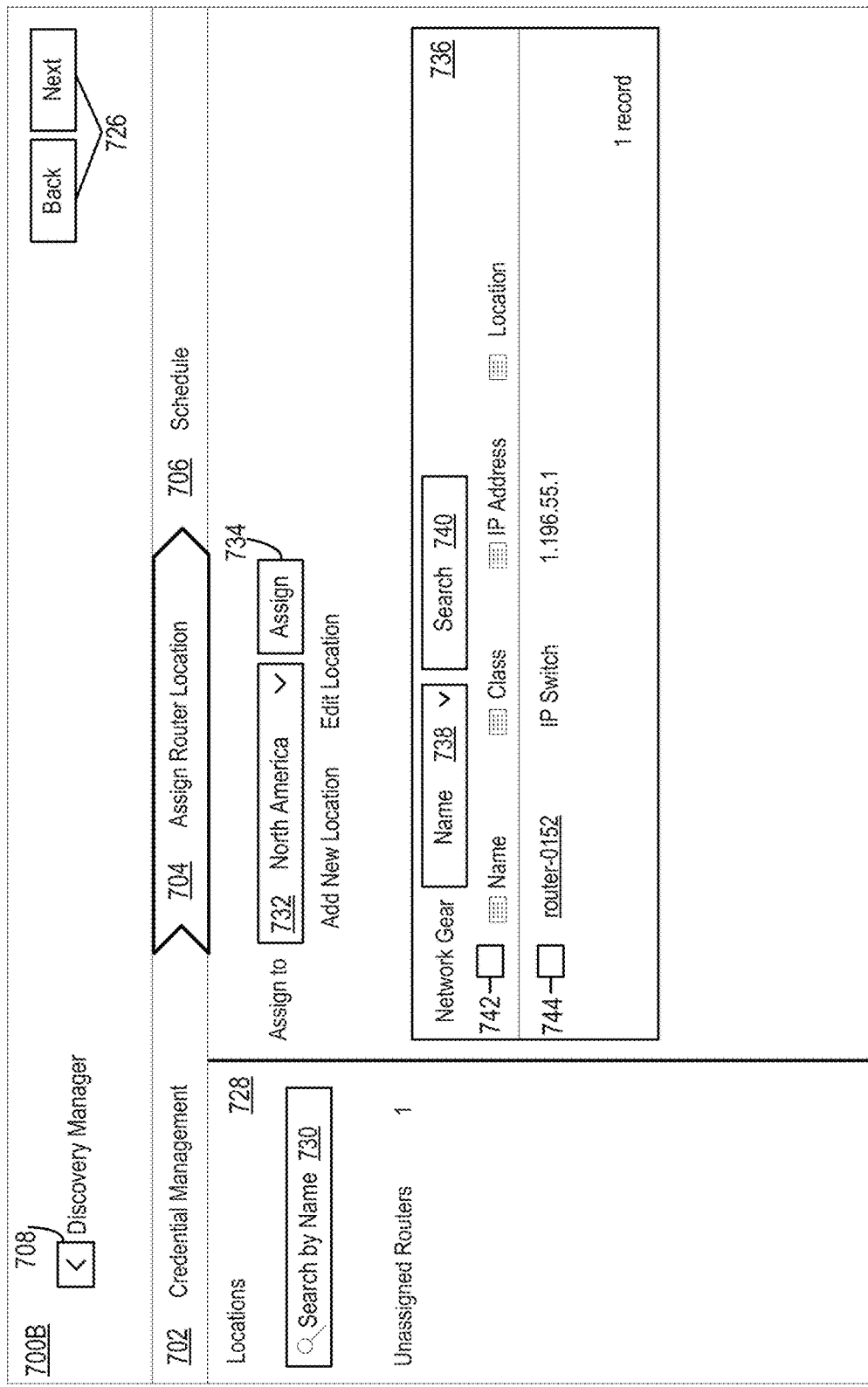
FIG. 7B depicts a router location pane, in accordance with example embodiments.

FIG. 7B shows router location pane 700B including the same navigation identifiers 702, 704, and 706, directory button 708, and navigation button(s) 726 as host credentials configuration pane 700A of FIG. 7A. Navigation identifier 704 is emphasized to indicate that this pane involves router location assignment. Router location pane 700B also includes location information 728, search box 730, region drop-down menu 732, assign button 734, router selection table 736, router drop-down menu 738, router search 740, table checkbox 742, and router checkbox 744.

Location information 728 may display a list including locations to which routers have been assigned (none are shown in FIG. 7B), and the number of routers that have not been assigned to any location. Search box 730 may allow searching and/or filtering the list for particular locations. For instance, if one or more routers have been assigned a location of San Diego, this location will be displayed if "San Diego" is entered into search box 730.

Region drop-down menu 732 may be a user-selectable drop-down menu that includes location to which routers can be assigned. For example, region drop-down menu 732 may include entries for "North America," "Miami," "Texas," "Rome," and/or "555 Main St., Seattle, Wash."

Router selection table 736 may display information about unassigned routers. Router selection table 736 may include a router drop-down menu 738, router search box 740, table checkbox 742, and router checkbox 744. Router drop-down menu 738 may control whether the unassigned routers are displayed sorted by their names or by other identifying characteristics. Router search box 740 may allow for textual searching of the unassigned routers. For instance, if text is entered into router search box 740, only unassigned routers with identifiers matching this text may be displayed in router selection table 736. Table checkbox 742 may be configured to select all unassigned routers for assignment. Router checkbox 744 may configured to select the corresponding unassigned router for assignment.

Assign button 734 may assign any selected routers (e.g., routers selected by table checkbox 742 or router checkbox 744) to the location specified in region drop-down menu 732. For example, if "Miami" is selected in region drop-down menu 732 and then assign button 734 is selected, all selected routers may be assigned to the location "Miami."

Figure 7C:
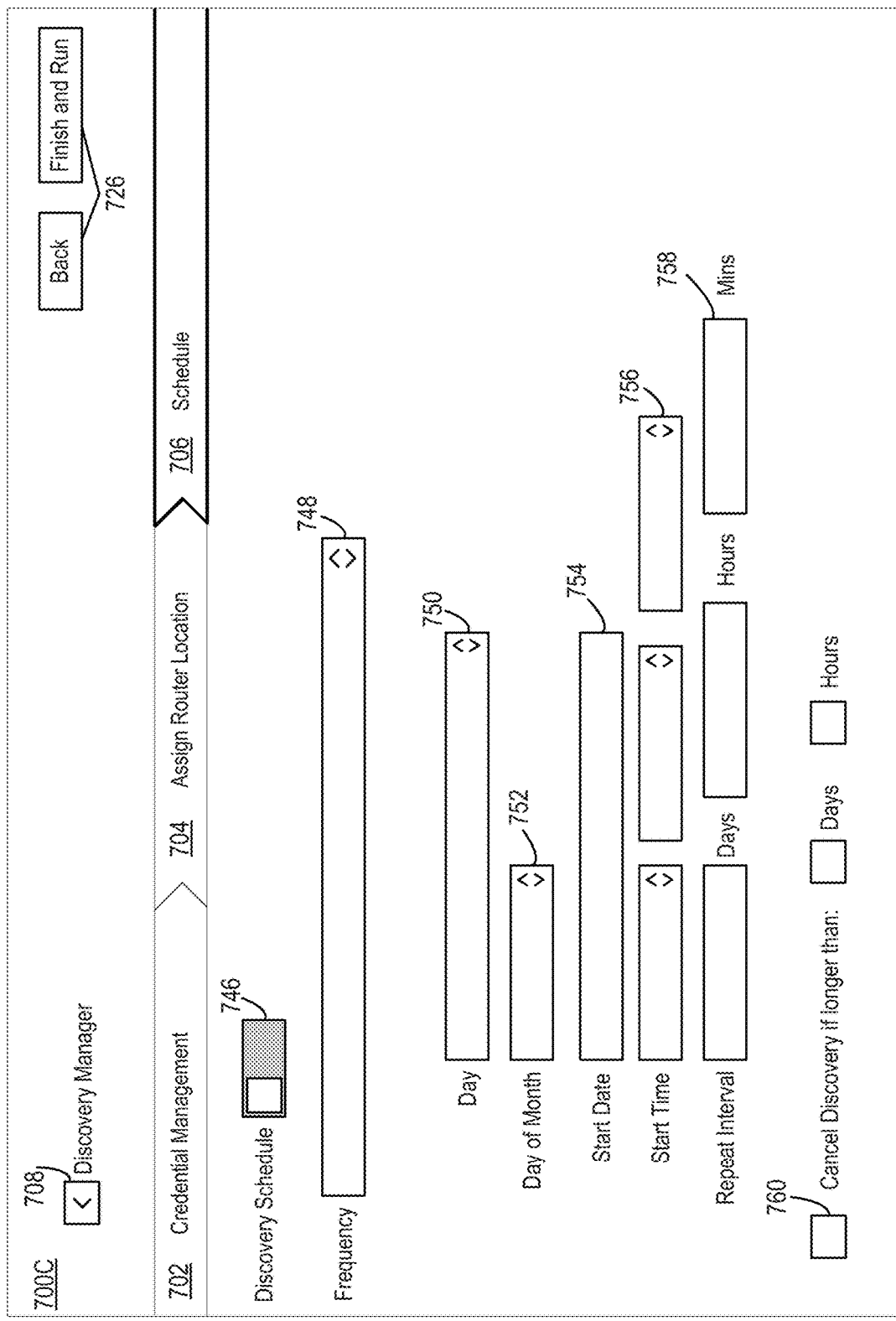
FIG. 7C depicts a host discovery scheduling pane, in accordance with example embodiments.

Selecting "Next" on navigation button(s) 726 in may result the GUI switching from displaying router location pane 700B to displaying host discovery scheduling pane 700C (as shown in FIG. 7C).

FIG. 7C shows host discovery scheduling pane 700C. This pane includes the same navigation identifiers 702, 704, and 706, directory button 708, and navigation buttons 726 as host credentials configuration pane 700A and router location pane 700B. Navigation identifier 706 is emphasized to indicate that this pane involves scheduling of host discovery. Host discovery scheduling pane 700C also includes schedule toggle 746, frequency selector 748, day selector 750, day of month selector 752, start date 754, start time 756, repeat interval 758, and checkbox 760.

Schedule toggle 746 may be configured to activate the host discovery scheduling feature. Schedule toggle 746 may have two states, on and off. When schedule toggle 746 is off, frequency selector 748, day selector 750, day of month selector 752, start date 754, start time 756, repeat interval 758, and checkbox 760 may be grayed out and/or not selectable. When schedule toggle 746 is on, the same elements may be active and selectable by a network manager. In FIG. 7C, the schedule toggle is shown as off.

Frequency selector 748 may be a drop-down menu that has various options for the frequency at which host discovery operates. The options in frequency selector 748 may include "Hourly," "Daily," "Weekly," "Monthly," "Once," "Periodically," and "On Demand." Selection of one of these in frequency selector 748 may affect which of the remaining day selector 750, day of month selector 752, start date 754, start time 756, and repeat interval 758 are displayed. For example, if "Daily" is selected in frequency selector 748, then start time 756 may be displayed but day selector 750, day of month selector 752, and repeat interval 758 might not be displayed. In another example, if "Monthly" is selected in frequency selector 748, day of month selector 752 and start time 756 may be displayed, but day selector 750 and repeat interval 758 might not be displayed. In another example, if "Once" is selected in frequency selector 748, day selector 750 and start time 756 may be displayed, while day of month selector 752 and repeat interval 758 might not be displayed.

Checkbox 760 may be configured to cancel host discovery operations if the discovery process lasts longer than a predetermined amount of time. When selected, checkbox 760 may display additional fields to specify the number of days and hours that host discovery should run before being cancelled. For example, checkbox 760 may be selected and the additional fields may receive an input of one day and three hours. If discovery operations take longer than this amount of time, the discovery process will cease and the output may be the hosts that were discovered during the time that discovery was operating.

Navigation button(s) 726 include a "Finish and Run" button. Selecting this button may cause host discovery to begin. Selection of the "Back" button of navigation button(s) 726 may cause the GUI to switch to router location pane 700B.

Notably, placement of host discovery scheduling pane 700C after host credentials configuration pane 700A and router location pane 700B prompts the user to make sure that proper host credentials are entered and router locations are assigned before host discovery is scheduled and run. This arrangement reduces the likelihood that host discovery will fail for some devices due to lack of proper credentials. This arrangement also increases the likelihood that host discovery will run during a time at which the managed network is lightly loaded (e.g., overnight or off-peak hours).

Figure 7D:
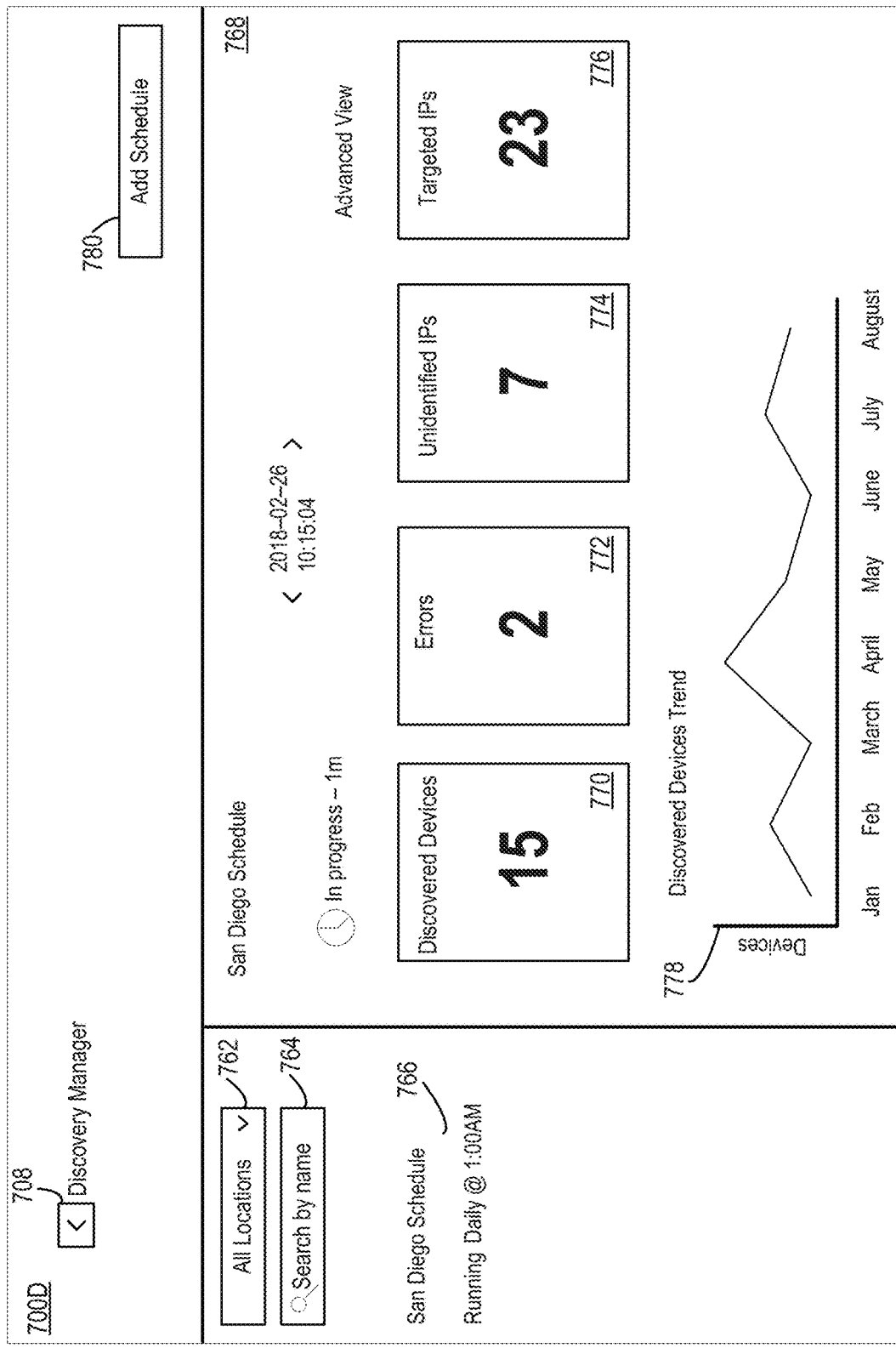
FIG. 7D depicts a host discovery results pane, in accordance with example embodiments.

FIG. 7D shows host discovery results pane 700D, which includes the same directory button 708 and navigation button(s) 726 as FIGS. 7A-7C, but may also include schedule drop-down menu 762, schedule search box 764, schedule selector 766, schedule information window 768, host results windows 770, 772, 774, and 776, and host trend graph 778.

Schedule drop-down menu 762 may be configured to allow selection of a location that has a schedule for host discovery. Schedule search box 764 may be configured to allow entry of a string to search for and/or filer the displayed locations. Schedule selector 766 may be list of host discovery schedules generated based on input from schedule drop-down menu 762 and/or schedule search box 764. In operation, selection of one of the schedules displayed in schedule selector 766 may cause schedule information window 768 to display host discovery results for the selected schedule.

Schedule information window 768 may be a GUI element configured to display host discovery results that correspond to the selected schedule. Schedule information window 768 may include textual information regarding the selected schedule, as well as host results windows 770, 772, 774, and 776, and host trend graph 778.

The textual information may include (i) the name of the schedule, (ii) the timestamp of the most recent discovery operation in accordance with this schedule, (iii) and a discovery progress indicator. The name of the schedule may be a string that corresponds to the selected schedule. In FIG. 7D, the name of the subnet schedule is "San Diego Schedule." The timestamp of the most recent discovery operation may be a string indicating a date and time. In FIG. 7D, the time stamp is "2018-02-26 10:15:04." The discovery progress indicator may be a string indicating the current progress of the discovery operation. In FIG. 7D, the discovery progress indicator is "In progress—1 m," indicating that the discovery for the selected schedule is currently running, and has been running for one minute.

Host results windows 770, 772, 774, and 776 may include results from the currently running or most-recently performed host discovery operation. Specifically, host results window 770 may include the number of discovered devices. A discovered device may be a host that was able to be accessed using the credentials entered in host credentials configuration pane 700A in FIG. 7A. As shown in FIG. 7D, host results window 770 shows that 15 devices were discovered.

Host results window 772 may include the number of errors encountered during the discovery operation. An error may include a problem encountered when attempting to access a discovered device, such as all access attempts failing due to incorrect credentials. As shown in FIG. 7D, host results window 772 shows that 2 errors occurred during discovery.

Host results window 774 may include the number of unidentified IP addresses discovered. An IP address may be considered unidentified if the device using that address was unable to be identified. As shown in FIG. 7D, host results window 774 shows that there were 7 unidentified IP addresses.

Results window 776 may include the number of targeted IP addresses discovered. Targeted IP addresses are addresses that were specifically configured to be probed during discovery. As shown in FIG. 7D, host results window 776 shows that there were 23 targeted IP addresses.

Host trend graph 778 may include a graphical representation of the number of discovered devices over a period of time or a number of discovery operations. Host trend graph 778 may be user-customizable to determine the time period or the number of discovery operations. As shown in FIG. 7D, host trend graph 778 shows the number of discovered devices over an 8 month period between January and August.

Notably, the arrangement of host discovery scheduling pane 700C followed by host discovery results pane 700D in this workflow logically guides the user to view the results of the scheduled host discovery. A user is prompted to specify schedule details to discover hosts on various subnets, and then the user is shown the results of the scheduled discovery.

While the previous discussion implies that panes of the host discovery workflow should be presented in the order in which they were described (e.g., from the pane of FIG. 7A, then to that of FIG. 7B, then to that of FIG. 7C, and then to that of FIG. 7D), this need not be the case. While the described ordering has the advantages discussed above, other orderings of these and/or other panes may be used in similarly effective workflows.

VI. Example Operations

Figure 8:
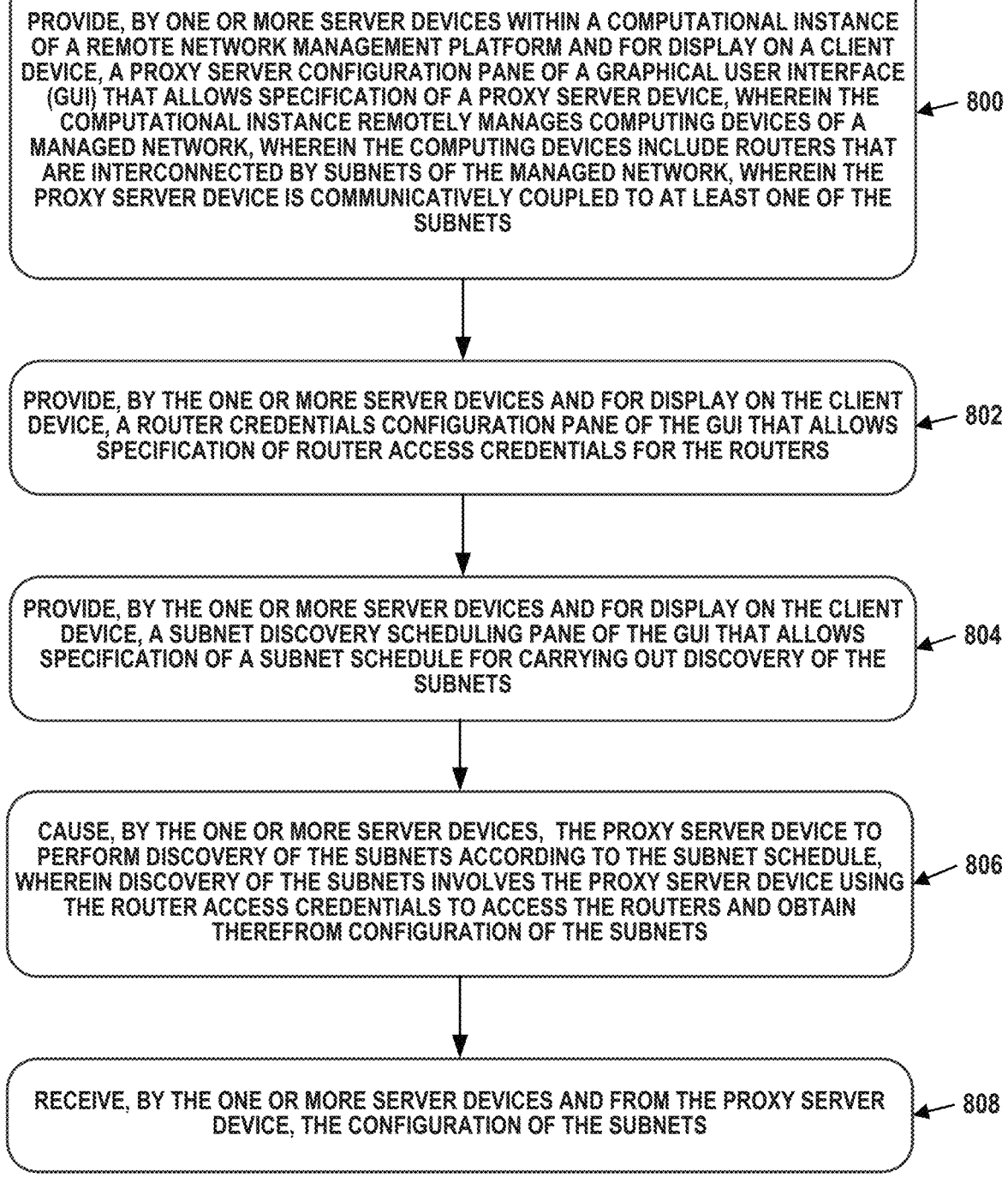
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 of FIG. 8 may involve providing, by one or more server devices within a computational instance of a remote network management platform and for display on a client device, a proxy server configuration pane of a GUI that allows specification of a proxy server device. The computational instance may remotely manage computing devices of a managed network. The computing devices may include routers that are interconnected by subnets of the managed network. The proxy server device may be communicatively coupled to at least one of the subnets.

Block 802 may involve providing, by the one or more server devices and for display on the client device, a router credentials configuration pane of the GUI that allows specification of router access credentials for the routers.

Block 804 may involve providing, by the one or more server devices and for display on the client device, a subnet discovery scheduling pane of the GUI that allows specification of a subnet schedule for carrying out discovery of the subnets.

Block 806 may involve causing, by the one or more server devices, the proxy server device to perform discovery of the subnets according to the subnet schedule. Discovery of the subnets may involve the proxy server device using the router access credentials to access the routers and obtain therefrom configuration of the subnets.

Block 808 may involve receiving, by the one or more server devices and from the proxy server device, the configuration of the subnets.

Some embodiments may further involve: in response to the proxy server device performing discovery of the subnets, providing, for display on the client device, a subnet discovery results pane of the GUI that displays information from the configuration of the subnets regarding a number of routers that were reached during subnet discovery and a number of subnets that were identified during subnet discovery.

In some embodiments, the computing devices also include hosts that are interconnected by the subnets. In these embodiments, the computer-implemented may further involve (i) providing, for display on the client device, a host credentials configuration pane of the GUI that allows specification of host access credentials for the hosts, (ii) providing, for display on the client device, a host discovery scheduling pane of the GUI that allows specification of a host schedule for carrying out discovery of the hosts, (iii) causing the proxy server device to perform discovery of the hosts according to the host schedule, where discovery of the hosts may involve the proxy server device using the host access credentials to, based on the configuration of the subnets, access the hosts and obtain therefrom configuration of the hosts, and (iv) receiving, from the proxy server device, the configuration of the hosts.

In some embodiments, the host access credentials may include secure shell (SSH) credentials.

Some embodiments may further involve, before providing the host discovery scheduling pane of the GUI, providing, for display on the client device, a router location pane of the GUI that allows specification of locations respectively associated with the routers that were discovered.

In some embodiments, the host discovery scheduling pane may allow specification of a host schedule for a particular group of the hosts by the associated location of a particular router of the managed network that shares one of the subnets with the particular group of hosts.

Some embodiments may further involve, in response to the proxy server device performing discovery of the hosts, providing, for display on the client device, a host discovery results pane of the GUI that displays a number of hosts discovered in the location of the particular router.

In some embodiments, the host discovery results pane may also display a number of Internet Protocol (IP) addresses associated with hosts that were not identified during discovery of the hosts.

In some embodiments, the proxy server configuration pane may allow specification or selection of multiple proxy server devices from a list of available proxy server devices.

In some embodiments, the router access credentials may include simple network management protocol (SNMP) credentials.

In some embodiments, the router credentials configuration pane may include a toggle for testing the router access credentials. These embodiments may further involve, (i) detecting, by the one or more server devices, activation of the toggle, (ii) in response to detecting activation of the toggle, causing the proxy server device to use the router access credentials in an attempt to access a router of the managed network that shares a subnet with the proxy server device, and (iii) displaying, on the router credentials configuration pane, an indication of success or failure of the attempt.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising one or more server devices within a computational instance of a remote network management platform, wherein the computational instance remotely manages computing devices of a managed network, wherein the computing devices include routers that are interconnected by subnets of the managed network, wherein the managed network also includes a proxy server device communicatively coupled to at least one of the subnets, and wherein the one or more server devices are configured to:
provide, for display on a client device, a proxy server configuration pane of a graphical user interface (GUI) that allows specification of the proxy server device;
provide, for display on the client device, a router credentials configuration pane of the GUI that allows specification of router access credentials for the routers;
provide, for display on the client device, a subnet discovery scheduling pane of the GUI that allows specification of a subnet schedule for carrying out discovery of the subnets;
cause the proxy server device to perform discovery of the subnets according to the subnet schedule, wherein discovery of the subnets involves the proxy server device using the router access credentials to access the routers and obtain therefrom configuration of the subnets;
receive, from the proxy server device, the configuration of the subnets; and
in response to the proxy server device performing discovery of the subnets, provide, for display on the client device, a subnet discovery results pane of the GUI that displays information from the configuration of the subnets regarding a number of routers that were reached during subnet discovery and a number of subnets that were identified during subnet discovery.

2. The computing system of claim 1, wherein the proxy server configuration pane allows specification or selection of multiple proxy server devices from a list of available proxy server devices.

3. The computing system of claim 1, wherein the router access credentials include simple network management protocol (SNMP) credentials.

4. A computing system comprising one or more server devices within a computational instance of a remote network management platform, wherein the computational instance remotely manages computing devices of a managed network, wherein the computing devices include routers that are interconnected by subnets of the managed network, wherein the managed network also includes a proxy server device communicatively coupled to at least one of the subnets, and wherein the one or more server devices are configured to:
provide, for display on a client device, a proxy server configuration pane of a graphical user interface (GUI) that allows specification of the proxy server device;
provide, for display on the client device, a router credentials configuration pane of the GUI that allows specification of router access credentials for the routers;
provide, for display on the client device, a subnet discovery scheduling pane of the GUI that allows specification of a subnet schedule for carrying out discovery of the subnets;
cause the proxy server device to perform discovery of the subnets according to the subnet schedule, wherein discovery of the subnets involves the proxy server device using the router access credentials to access the routers and obtain therefrom configuration of the subnets;
receive, from the proxy server device, the configuration of the subnets;
wherein the computing devices also include hosts that are interconnected by the subnets, and wherein the one or more server devices are further configured to:
provide, for display on the client device, a host credentials configuration pane of the GUI that allows specification of host access credentials for the hosts;
provide, for display on the client device, a host discovery scheduling pane of the GUI that allows specification of a host schedule for carrying out discovery of the hosts;
cause the proxy server device to perform discovery of the hosts according to the host schedule, wherein discovery of the hosts involves the proxy server device using the host access credentials to, based on the configuration of the subnets, access the hosts and obtain therefrom configuration of the hosts; and
receive, from the proxy server device, the configuration of the hosts.

5. The computing system of claim 4, wherein the one or more server devices are further configured to:
before providing the host discovery scheduling pane of the GUI, provide, for display on the client device, a router location pane of the GUI that allows specification of locations respectively associated with the routers that were discovered.

6. The computing system of claim 5, wherein the host discovery scheduling pane allows specification of a host schedule for a particular group of the hosts by the associated location of a particular router of the managed network that shares one of the subnets with the particular group of hosts.

7. The computing system of claim 6, wherein the one or more server devices are further configured to:
in response to the proxy server device performing discovery of the hosts, provide, for display on the client device, a host discovery results pane of the GUI that displays a number of hosts discovered in the location of the particular router.

8. The computing system of claim 7, wherein the host discovery results pane also displays a number of Internet Protocol (IP) addresses associated with hosts that were not identified during discovery of the hosts.

9. The computing system of claim 4, wherein the host access credentials include secure shell (SSH) credentials.

10. A computing system comprising one or more server devices within a computational instance of a remote network management platform, wherein the computational instance remotely manages computing devices of a managed network, wherein the computing devices include routers that are interconnected by subnets of the managed network, wherein the managed network also includes a proxy server device communicatively coupled to at least one of the subnets, and wherein the one or more server devices are configured to:
provide, for display on a client device, a proxy server configuration pane of a graphical user interface (GUI) that allows specification of the proxy server device;
provide, for display on the client device, a router credentials configuration pane of the GUI that allows specification of router access credentials for the routers;
provide, for display on the client device, a subnet discovery scheduling pane of the GUI that allows specification of a subnet schedule for carrying out discovery of the subnets;
cause the proxy server device to perform discovery of the subnets according to the subnet schedule, wherein discovery of the subnets involves the proxy server device using the router access credentials to access the routers and obtain therefrom configuration of the subnets;
receive, from the proxy server device, the configuration of the subnets;
wherein the router credentials configuration pane includes a toggle for testing the router access credentials, and wherein the one or more server devices are further configured to:
in response to detecting activation of the toggle, cause the proxy server device to use the router access credentials in an attempt to access a router of the managed network that shares a subnet with the proxy server device; and
display, on the router credentials configuration pane, an indication of success or failure of the attempt.

11. A computer-implemented method comprising:
providing, by one or more server devices within a computational instance of a remote network management platform and for display on a client device, a proxy server configuration pane of a graphical user interface (GUI) that allows specification of a proxy server device, wherein the computational instance remotely manages computing devices of a managed network, wherein the computing devices include routers that are interconnected by subnets of the managed network, and wherein the proxy server device is communicatively coupled to at least one of the subnets;
providing, by the one or more server devices and for display on the client device, a router credentials configuration pane of the GUI that allows specification of router access credentials for the routers;
providing, by the one or more server devices and for display on the client device, a subnet discovery scheduling pane of the GUI that allows specification of a subnet schedule for carrying out discovery of the subnets;
causing, by the one or more server devices, the proxy server device to perform discovery of the subnets according to the subnet schedule, wherein discovery of the subnets involves the proxy server device using the router access credentials to access the routers and obtain therefrom configuration of the subnets;
receiving, by the one or more server devices and from the proxy server device, the configuration of the subnets; and
in response to the proxy server device performing discovery of the subnets, providing, for display on the client device, a subnet discovery results pane of the GUI that displays information from the configuration of the subnets regarding a number of routers that were reached during subnet discovery and a number of subnets that were identified during subnet discovery.

12. A computer-implemented method comprising:

providing, by one or more server devices within a computational instance of a remote network management platform and for display on a client device, a proxy server configuration pane of a graphical user interface (GUI) that allows specification of a proxy server device, wherein the computational instance remotely manages computing devices of a managed network, wherein the computing devices include routers that are interconnected by subnets of the managed network, and wherein the proxy server device is communicatively coupled to at least one of the subnets;

providing, by the one or more server devices and for display on the client device, a router credentials configuration pane of the GUI that allows specification of router access credentials for the routers;

providing, by the one or more server devices and for display on the client device, a subnet discovery scheduling pane of the GUI that allows specification of a subnet schedule for carrying out discovery of the subnets;

causing, by the one or more server devices, the proxy server device to perform discovery of the subnets according to the subnet schedule, wherein discovery of the subnets involves the proxy server device using the router access credentials to access the routers and obtain therefrom configuration of the subnets;

receiving, by the one or more server devices and from the proxy server device, the configuration of the subnets, wherein the computing devices also include hosts that are interconnected by the subnets;

providing, for display on the client device, a host credentials configuration pane of the GUI that allows specification of host access credentials for the hosts;

providing, for display on the client device, a host discovery scheduling pane of the GUI that allows specification of a host schedule for carrying out discovery of the hosts;

causing the proxy server device to perform discovery of the hosts according to the host schedule, wherein discovery of the hosts involves the proxy server device using the host access credentials to, based on the configuration of the subnets, access the hosts and obtain therefrom configuration of the hosts; and receiving, from the proxy server device, the configuration of the hosts.

13. The computer-implemented method of claim 12, further comprising:

before providing the host discovery scheduling pane of the GUI, providing, for display on the client device, a router location pane of the GUI that allows specification of locations respectively associated with the routers that were discovered.

14. The computer-implemented method of claim 13, wherein the host discovery scheduling pane allows specification of a host schedule for a particular group of the hosts by the associated location of a particular router of the managed network that shares one of the subnets with the particular group of hosts.

15. The computer-implemented method of claim 14, further comprising:

in response to the proxy server device performing discovery of the hosts, providing, for display on the client device, a host discovery results pane of the GUI that displays a number of hosts discovered in the location of the particular router.

16. The computer-implemented method of claim 15, wherein the host discovery results pane also displays a number of Internet Protocol (IP) addresses associated with hosts that were not identified during discovery of the hosts.

17. A computer-implemented method comprising:

providing, by one or more server devices within a computational instance of a remote network management platform and for display on a client device, a proxy server configuration pane of a graphical user interface (GUI) that allows specification of a proxy server device, wherein the computational instance remotely manages computing devices of a managed network, wherein the computing devices include routers that are interconnected by subnets of the managed network, and wherein the proxy server device is communicatively coupled to at least one of the subnets;

providing, by the one or more server devices and for display on the client device, a router credentials configuration pane of the GUI that allows specification of router access credentials for the routers, wherein the router credentials configuration pane includes a toggle for testing the router access credentials;

providing, by the one or more server devices and for display on the client device, a subnet discovery scheduling pane of the GUI that allows specification of a subnet schedule for carrying out discovery of the subnets;

causing, by the one or more server devices, the proxy server device to perform discovery of the subnets according to the subnet schedule, wherein discovery of the subnets involves the proxy server device using the router access credentials to access the routers and obtain therefrom configuration of the subnets;

receiving, by the one or more server devices and from the proxy server device, the configuration of the subnets;

in response to detecting activation of the toggle, causing the proxy server device to use the router access credentials in an attempt to access a router of the managed network that shares a subnet with the proxy server device; and displaying, on the router credentials configuration pane, an indication of success or failure of the attempt.

18. An article of manufacture including a non-transitory computer-readable medium, having stored thereon program instructions that, upon execution by a server device within a computational instance of a remote network management platform, cause the server device to perform operations comprising:

providing, for display on a client device, a proxy server configuration pane of a graphical user interface (GUI) that allows specification of a proxy server device, wherein the computational instance remotely manages computing devices of a managed network, wherein the computing devices include routers that are interconnected by subnets of the managed network, wherein the proxy server device is communicatively coupled to at least one of the subnets;

providing, for display on the client device, a router credentials configuration pane of the GUI that allows specification of router access credentials for the routers;

providing, for display on the client device, a subnet discovery scheduling pane of the GUI that allows specification of a subnet schedule for carrying out discovery of the subnets;

causing the proxy server device to perform discovery of the subnets according to the subnet schedule, wherein discovery of the subnets involves the proxy server device using the router access credentials to access the routers and obtain therefrom configuration of the subnets;

receiving, from the proxy server device, the configuration of the subnets; and in response to the proxy server device performing discovery of the subnets, providing, for display on the client device, a subnet discovery results pane of the GUI that displays information from the configuration of the subnets regarding a number of routers that were reached during subnet discovery and a number of subnets that were identified during subnet discovery.

* * * * *